(No Model.) 2 Sheets—Sheet 1.

J. ASHENFELTER.
COMBINED CULTIVATOR AND PULVERIZER.

No. 369,492. Patented Sept. 6, 1887.

WITNESSES:
George Binkenburg
E. M. Clark

INVENTOR:
Joseph Ashenfelter
BY Munn & Co.
ATTORNEYS.

(No Model.) 2 Sheets—Sheet 2.
J. ASHENFELTER.
COMBINED CULTIVATOR AND PULVERIZER.
No. 369,492. Patented Sept. 6, 1887.
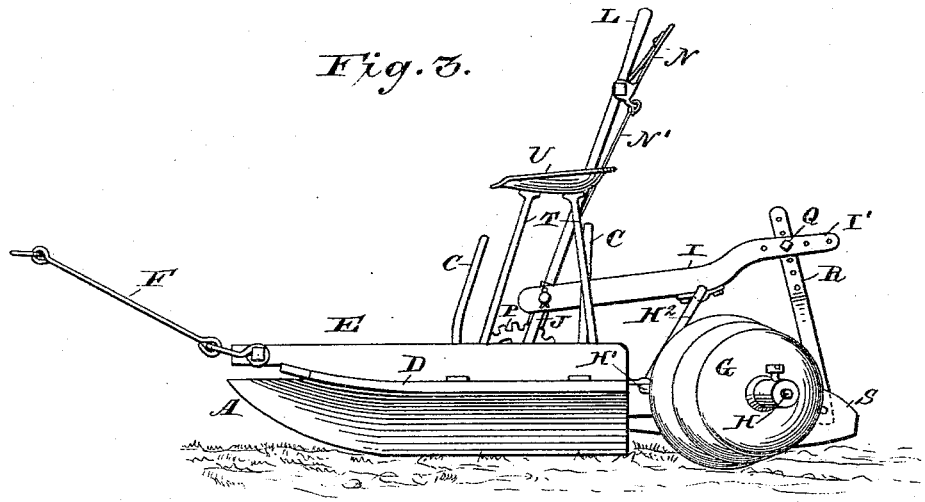
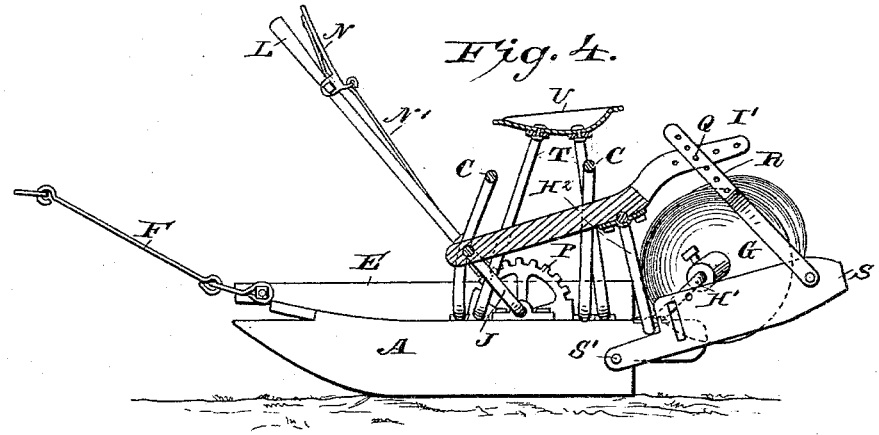
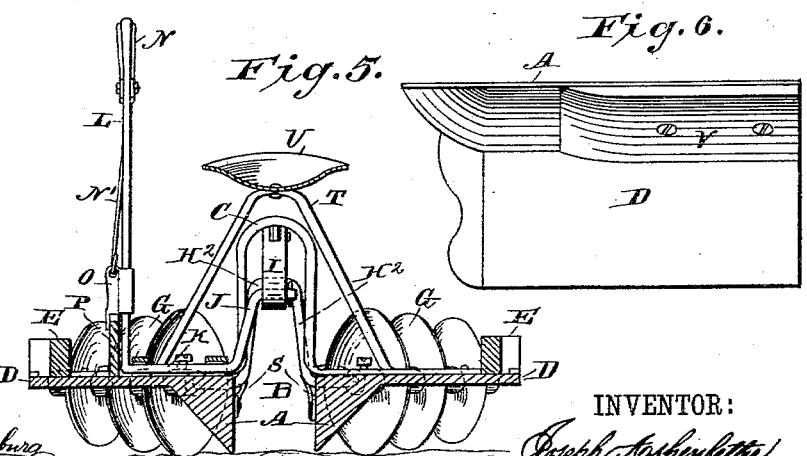
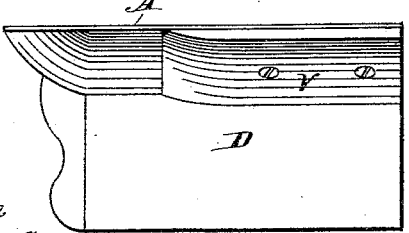
WITNESSES:
George Binkenburg
E. M. Clark
INVENTOR:
Joseph Ashenfelter
BY Munn & Co.
ATTORNEYS.

UNITED STATES PATENT OFFICE.

JOSEPH ASHENFELTER, OF LIBERTY, NEBRASKA.

COMBINED CULTIVATOR AND PULVERIZER.

SPECIFICATION forming part of Letters Patent No. 369,492, dated September 6, 1887.

Application filed July 8, 1887. Serial No. 243,763. (No model.)

*To all whom it may concern:*

Be it known that I, JOSEPH ASHENFELTER, of Liberty, in the county of Gage and State of Nebraska, have invented a new and Improved Combined Cultivator and Pulverizer, of which the following is a full, clear, and exact description.

The object of my invention is to provide a new and improved cultivator and pulverizer for pulverizing the earth on the rows of listed corn and in the furrows between the rows, for destroying the weeds and loosening the ground, and also for hilling the rows of listed corn with any desired amount of clean earth.

The invention consists of two runners connected together and each carrying an outwardly-extending platform crusher, and of sets of disks held at an angle to the runners at the rear of the same, and adapted for cutting the weeds and hilling the rows of listed corn with earth.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
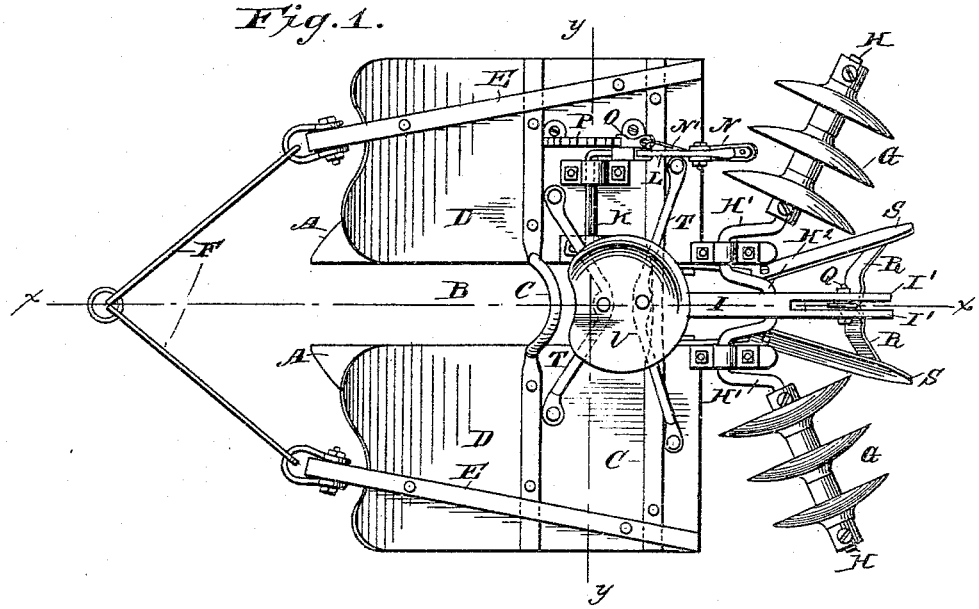
Figure 2:
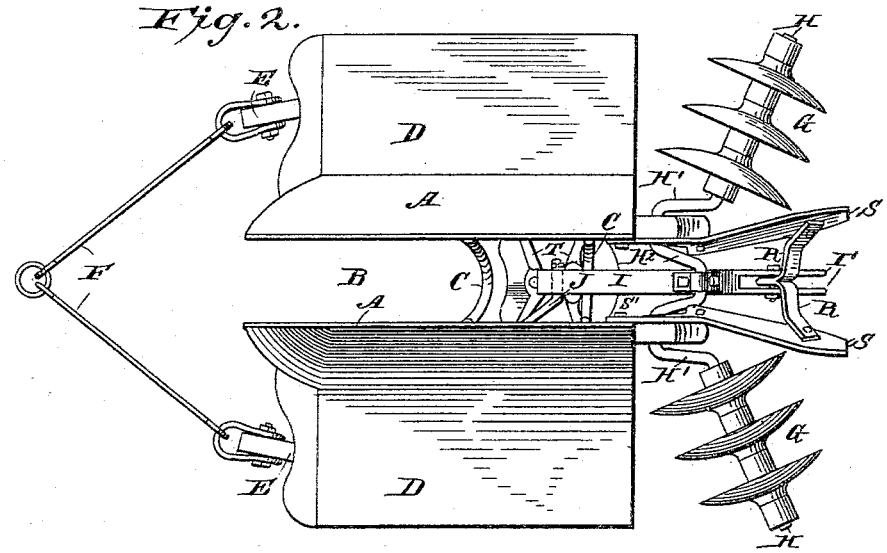

Figure 1 is a plan view of my improvement. Fig. 2 is a bottom view of the same. Fig. 3 is a side elevation of the same. Fig. 4 is a longitudinal sectional elevation of the same on the line $x$ $x$ of Fig. 1. Fig. 5 is a vertical cross-section of the same on the line $y$ $y$ of Fig. 1, and Fig. 6 is a bottom view of a modified form of one of the runners.

My combined cultivator and pulverizer is provided with two triangular-shaped runners, A, placed a suitable distance apart, so as to form the space B, and held parallel with each other, being connected by suitable cross-pieces, C, which are curved in the middle above the space B, so as to give ample room for the listed corn to pass through the space B when the machine is pulled forward. Each of the runners A is provided on its upper edge with an outwardly-extending platform crusher, D, which is smooth on its under side and provided on top with the drawing-beams E, connected at their front ends by links F, carrying the doubletree, to which the team is hitched in the usual manner.

At the rear end of each platform D is placed a set of cutting-disks, G, mounted to rotate loosely on a shaft, H, extending in an angular direction from the runners A, said shaft H continuing into a crank-arm, H', which has suitable bearings at the rear of the runners A. The middle of the shaft H is again formed into a crank-arm, H², pivotally connected with the lever I, held above and in the middle between the runners A, and connected at its free end with a crank-arm, J, formed on the shaft K, having its bearings on one of the platforms D.

The outer end of the shaft K forms a lever, L, extending upward and provided with a hand-lever, N, connected by the link N' with a pawl, O, held on said lever L and engaging the teeth of a segment, P, secured to the respective platform D on which said shaft K is located. The rear end of the lever I is provided with two forked arms, I', each provided with a series of transverse apertures, through one of which a bolt, Q, passes, which also passes through one of a series of apertures formed in the upper end of the fork R, the upper end of which passes between the arms I', the fork R being connected at its forked lower end with the shields S, pivoted at their inner ends, at S', to the insides of the runners A at their rear ends.

Each of the shields S extends toward the rear and outward from said runners A, and is intended to direct the weeds cut by the sets of disks G into the furrow and away from the row of listed corn.

On the platforms D are secured the upwardly-extending supports T, which carry a driver's seat, U, held in the middle above the runners A, near the rear end of the same.

The operation is as follows: The machine is placed in such a position in relation to the rows of listed corn that the latter extend longitudinally in the space B between the runners A, and when the machine is now drawn forward by the team hitched to the links F the runners A bear heavily on the ground on each side of the row of listed corn. The under side of each platform D rests on the ground in the furrow between two rows of listed corn, so that the clods in the furrows are pulverized and crushed as the machine is moved forward. The sets of disks G cut into the pulverized ground, thus destroying the weeds in the furrows, said weeds being kept away from the rows of plants by the shields S. At the same time, as the lower edges of said shields S are a suitable distance above the lower edges of the sets of disks G, it will be seen that the angular position of the sets of disks G throws a considerable amount of clean earth on the listed corn, thus hilling the latter. The depth of the sets of disks in the ground and the relative positions of the shields S are simultaneously regulated by the operator, who adjusts the lever L forward or backward by first disengaging the pawl O from the segment P by pressing on the hand-lever N. This forward and backward motion of the lever L causes the front end of the lever I to be raised or lowered, and at the same time moved forward or backward, so that said lever raises or lowers the shaft H by means of the crank-arms H' and H², and also the sets of disks G held on said shaft. The forward and backward and up and down movements of said lever I also impart a swinging motion, by means of the fork R, to the shields S, which are correspondingly raised or lowered in relation to the sets of disks G. The amount of movement given to the shields S can be increased or diminished in relation to the movement of the disks G by adjusting the bolt Q forward or backward in the forks I', and also adjusting said bolt in the apertures of the fork R.

When it is desirable to go over a row of plants a second time, I prefer to attach the plate V by suitable bolts or other means to each runner A, so as to broaden the rear and lower cutting-edges of the runners A.

Having thus fully described my invention, I claim as new and desire to secure by Letters Patent—

1. In a combined cultivator and pulverizer, the combination, with two runners placed parallel to each other and each carrying an outwardly-extending platform crusher, of sets of disks held at the rear of said platform crushers and adapted for cutting the weeds and hilling the rows of listed corn with earth, substantially as shown and described.

2. In a combined cultivator and pulverizer, the combination, with two runners placed parallel to each other, so as to form the space for the row of plants, of a platform crusher secured to the top of each runner and extending outward, and sets of disks held at the rear of said platform crushers and at an angle to said runners, substantially as shown and described.

3. In a combined cultivator and pulverizer, the combination, with two parallel runners connected with each other and forming a space for the passage of the rows of listed corn, of a platform crusher secured to each of said runners and extending outward, sets of disks held at the rear end of said platform crushers and extending toward the rear and outward, and shields held on the rear ends of said runners and extending outward, substantially as shown and described.

4. In a combined cultivator and pulverizer, two parallel runners connected with each other and a platform secured to the upper edge of each runner and extending outward, in combination with sets of disks held at the rear of said platform crushers, and means, substantially as described, for raising and lowering said sets of disks, as set forth.

5. In a combined cultivator and pulverizer, two parallel runners connected with each other and platform crushers secured to the upper edges of said runners and extending outward, so as to form a space between said runners for the passage of the row of listed corn, in combination with sets of disks held at the rear ends of said platform crushers, a shield pivoted to the rear end of each of said runners, and means, substantially as described, for raising said sets of disks and said shields simultaneously, substantially as set forth.

6. In a combined cultivator and pulverizer, the combination, with the runners, of two sets of cutting-disks projecting in an angular direction from the runners, shields pivoted to the rear ends of the runners and projecting rearwardly between the two sets of disks, and means for raising and lowering the disks and shields simultaneously, substantially as described.

7. In a combined cultivator and pulverizer, the sets of disks G and the pivoted shields S, in combination with the shaft H, on which the sets of disks are loosely mounted, said shaft being also provided with the crank-arms H' and H², the fork R, pivotally connected at its forked ends with said shields S, the lever I, pivotally connected with said crank-arms H² and said fork R, and the shaft K, provided with a crank-arm, J, pivotally connected with the front end of said lever I, said shaft K being adapted to receive a turning motion, substantially as shown and described.

8. In a combined cultivator and pulverizer, the sets of disks G and the pivoted shields S, in combination with the shaft H, on which said sets of disks are loosely mounted, said shaft being also provided with the crank-arms H' and H², the fork R, pivotally connected at its forked ends with said shields S, the lever I, pivotally connected with said crank-arms H and said fork R, the shaft K, provided with a crank-arm, J, pivotally connected with the front end of said lever I, said shaft K being adapted to receive a turning motion, and the lever L, for imparting a turning motion to said shaft K, substantially as shown and described.

9. In a combined cultivator and pulverizer, the sets of disks G and the pivoted shields S, in combination with the shaft H, on which said sets of disks are loosely mounted, said shaft being also provided with crank-arms H' and H², the fork R, pivotally connected at its forked ends with said shields S, the lever I, pivotally connected with said crank-arms H² and said fork R, the shaft K, provided with a crank-arm, J, pivotally connected with the front end of said lever I, said shaft K being adapted to receive a turning motion, and the lever L, for imparting a turning motion to said shaft K, and means, substantially as described, for locking said lever L in any desired position, as set forth.

JOSEPH ASHENFELTER.

Witnesses:
JOHN PATTERSON,
A. C. SPENCER.